United States Patent
Guillemot

(10) Patent No.: US 6,536,113 B2
(45) Date of Patent: Mar. 25, 2003

(54) METHOD OF MANUFACTURING A HYDRAULIC ANTI-VIBRATION MOUNT

(75) Inventor: Thierry Guillemot, Le Mesnil Saint-Denis (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/916,559

(22) Filed: Jul. 27, 2001

(65) Prior Publication Data

US 2002/0047080 A1 Apr. 25, 2002

(30) Foreign Application Priority Data

Jul. 28, 2000 (FR) .............................. 00 09955

(51) Int. Cl.[7] .......................... B21D 53/88; B23P 13/00
(52) U.S. Cl. ............... 29/896.93; 29/897.2; 267/140.13
(58) Field of Search ................. 29/896, 93, 897.2; 267/140.11, 140.13

(56) References Cited

U.S. PATENT DOCUMENTS

| | | | |
|---|---|---|---|
| 4,767,107 A | 8/1988 | Le Fol .................... | 267/140.1 |
| 4,893,797 A | 1/1990 | Le Fol et al. ............ | 267/140.1 |
| 4,986,510 A | 1/1991 | Bellamy et al. .......... | 248/562 |
| 5,411,243 A | 5/1995 | Gennesseaux ............ | 267/140.14 |
| 5,833,219 A | 11/1998 | Mellon ................... | 267/140.13 |

FOREIGN PATENT DOCUMENTS

| | | |
|---|---|---|
| EP | 0 346 227 | 12/1989 |
| EP | 1 028 268 | 8/2000 |
| FR | 2 593 868 | 8/1987 |
| FR | 2 751 042 | 1/1998 |
| JP | 08 200434 | 8/1996 |
| JP | 10 246277 | 9/1998 |

OTHER PUBLICATIONS

French Preliminary Search Report dated Mar. 23, 2001, Appl. No. 0009955.

Primary Examiner—P. W. Echols
(74) Attorney, Agent, or Firm—McCracken & Frank

(57) ABSTRACT

Process for manufacturing hydraulic anti-vibration mounts comprising two rigid parts (2, 4) connected by an elastomeric body (5) that partially defines a liquid-filled working chamber (A) that communicates via a restricted passage (C) with a compensating chamber (B). A rigid partition (6) which separates the working chamber (A) from the compensating chamber (B) comprises a recessed shell (10) whose upper face is covered by a closing plate (11). Two parallel grooves (16, 17) are let into the upper face of the recessed shell and communicate with the compensating chamber (B), while the closing plate comprises a cavity allowing communication between either both grooves, or one (16) of the grooves, and the working chamber (A) in order thus to define the restricted passage (C).

3 Claims, 2 Drawing Sheets

METHOD OF MANUFACTURING A HYDRAULIC ANTI-VIBRATION MOUNT

Figure 1:
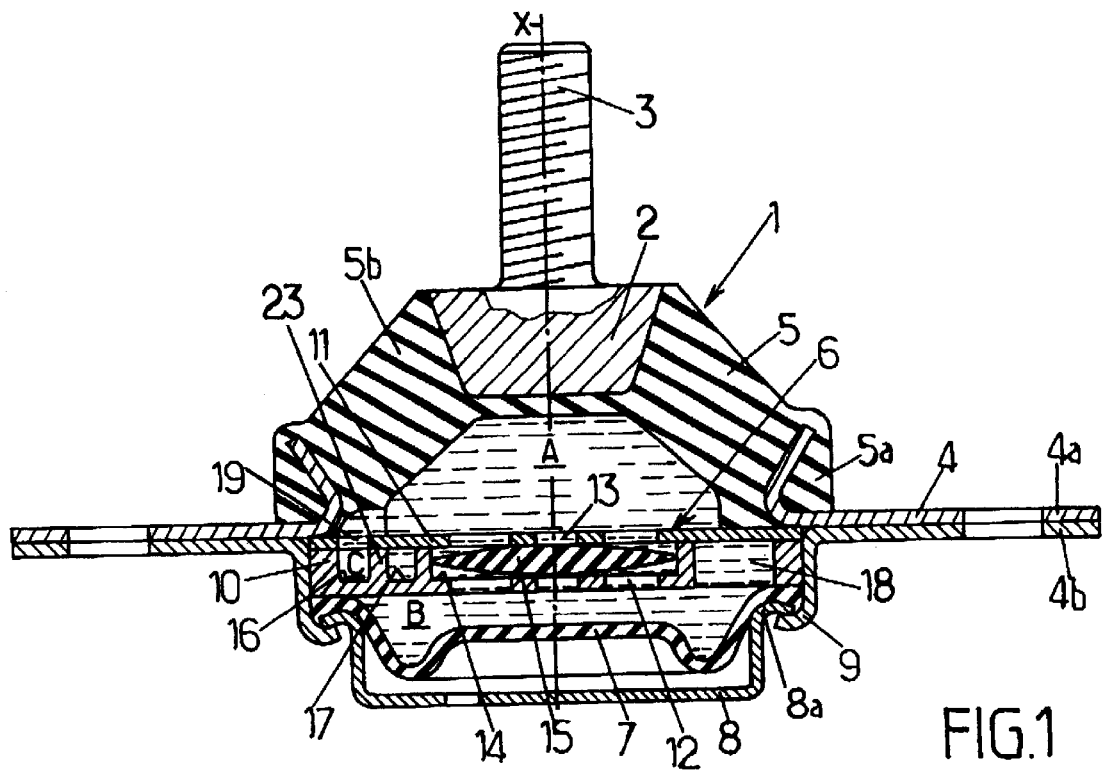

The present invention relates to processes for manufacturing hydraulic anti-vibration mounts designed to be inserted, for damping and connecting purposes, between two rigid elements such as an engine and the bodywork of a vehicle. It also relates to the mounts produced by these processes.

Of these mounts, the invention relates more particularly to those which comprise:

- a first rigid part and a second rigid part, each attachable to one of the two rigid elements to be connected together,
- an elastomeric body for connecting together the two rigid parts and partially defining a liquid-filled working chamber,
- a compensating chamber defined partially by a flexible, easily deformable wall,
- a rigid partition for separating the working chamber from the compensating chamber while defining a restricted passage allowing communication between the said chambers, the rigid partition comprising a rigid recessed shell having first and second faces, the first face of the rigid shell being oriented toward one of the two chambers, termed the first chamber, while the second face of the rigid partition is oriented toward the other of the two chambers, termed the second chamber.

A hydraulic anti-vibration mount such as this is disclosed for example in document FR 2 593 868.

These hydraulic anti-vibration mounts of the prior art are perfectly satisfactory and are very efficient at damping particularly relatively large-amplitude vibrations of relatively low frequency such as those due to the jolting caused in the vehicle by bumps in the road. In particular, the efficiency of these anti-vibration mounts is at is greatest for vibrations of a frequency corresponding to the resonance of the column of liquid contained in the restricted passage, which frequency depends on the geometrical dimensions of the said restricted passage and specifically on the ratio of the curvilinear length to.the equivalent diameter of this restricted passage.

This aspect means, however, that a greater number of types of product have to be produced, notably the types of rigid partition in which the restricted passage is defined, when it is desired to modify the set frequency of the anti-vibration mount, for example between two models of the same vehicle. This lack of standardization increases the cost price of the anti-vibration mount.

It is a particular object of the present invention to reduce this problem.

To this end, the invention provides a process for manufacturing hydraulic anti-vibration mounts belonging to at least a first group and a second group of mounts exhibiting a first and a second set frequency, respectively, and being designed to be inserted between two rigid elements that are to be connected together, this process comprising the operations of supplying and assembling:

- a first rigid part and a second rigid part, each attachable to one of the two rigid elements to be connected together,
- an elastomeric body for connecting together the two rigid parts and partially defining a liquid-filled working chamber,
- a compensating chamber defined partially by a flexible, easily deformable wall,
- a rigid partition for separating the working chamber from the compensating chamber while defining a restricted passage allowing communication between the said chambers, the rigid partition comprising a rigid recessed shell having first and second faces, the first face of the rigid shell being oriented toward one of the two chambers, termed the first chamber, while the second face of the rigid partition is oriented toward the other of the two chambers, termed the second chamber, this process being characterized in that it comprises the following steps:

a) manufacturing a plurality of rigid shells, all identical with each other, with a first groove and a second groove independent of the first groove, the said grooves being recessed in the first face of the rigid partition and communicating with the first chamber and with the second chamber through at least one opening formed in the rigid shell, b) manufacturing a plurality of closing plates designed to fit more or less leaktightly against the first face of the rigid shells in such a way as to cover the first and second grooves, in order at least partially to define the restricted passage, the closing plates being divided into at least a first group and a second group, the closing plates of the first group having a cavity located over the first groove of the rigid shells and having only a solid part over the second groove of the rigid shells, thus isolating this second groove, and, the closing plates of the second groove each having a cavity that is located over at least the second groove of the rigid shells, c) producing a first group of anti-vibration mounts by attaching the rigid shells to the closing plates of the first group, and a second group of anti-vibration mounts by attaching the rigid shells to the closing plates of the second group.

With these arrangements it is possible to standardize the manufacture of the rigid shell forming the essential element of the partition between the working and compensating chambers: in order to modify the set frequency of a given anti-vibration mount, e.g. to adapt it to a different engine in the same vehicle, only the closing plate of the rigid shell has to be modified in such a way that the closing plate allows communication between the first chamber and either the first groove only, or both the first and second grooves, or perhaps the second groove only if the latter is of different dimensions to the first groove.

Preferred embodiments of the invention may also, if required, make use of one or more of the following arrangements:

- the closing plates of the second group each comprise a cavity that is located over the first and second grooves of the rigid shells;
- gratings are formed, one in the rigid shell and the other in the closing plate;
- there is formed in the rigid shell a central housing that communicates with the first and second chambers, via the gratings;
- first and second grooves are formed so as to be concentric about the central housing;
- a flexible decoupling valve is placed in the central housing;
- the second groove communicates with the first chamber through the closing plate, the first and second grooves together at least partially forming the restricted passage;

the cavity of the closing plate that allows communication between the first groove and the first chamber, also allows communication between the second groove and the said first chamber;

the first and second grooves communicate with the second chamber via the said opening;

the first chamber consists of the working chamber and the second chamber consists of the compensating chamber;

the elastomeric body is shaped like a bell extending between a top integral with the first rigid part and an annular base integral with the second rigid part, the said annular base of the elastomeric body being attached leaktightly against a periphery of the closing plate of the rigid partition;

the first and second grooves run essentially parallel with each other on the first face of the rigid shell, the said grooves running between respective first ends, located in a solid portion of the rigid partition, and respective second ends communicating with the second chamber, the two grooves being separated from each other by a solid and continuous partition that joins the said solid part toward the first ends of the two grooves, and that runs as far as the second ends of the said two grooves, the said partition being in more or less leaktight contact with the closing plate between the first and second ends of the two grooves; and the rigid shell also includes a central housing containing a flexible decoupling valve that communicates with the first and second chambers via gratings formed respectively in the rigid shell and in the closing plate, the first and second grooves being arranged concentrically around the valve housing.

Other features and advantages of the invention will become apparent in the course of the following detailed description of two of its embodiments which are provided by way of nonrestrictive examples, with reference to the accompanying drawings.

Figure 2:
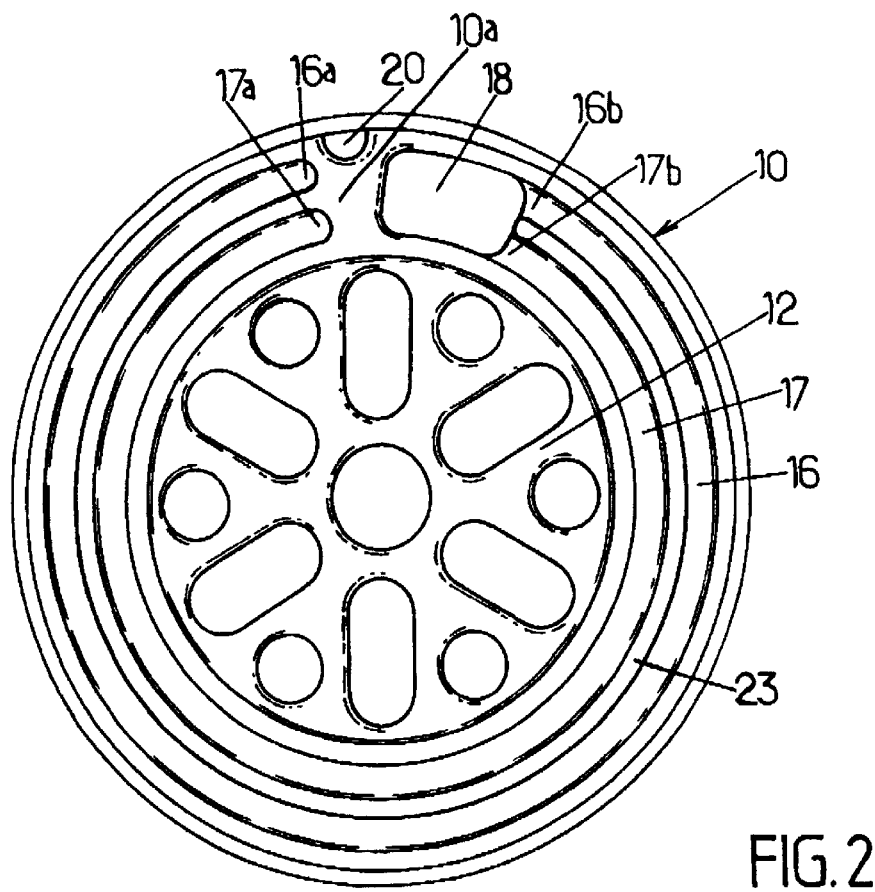
Figure 3:
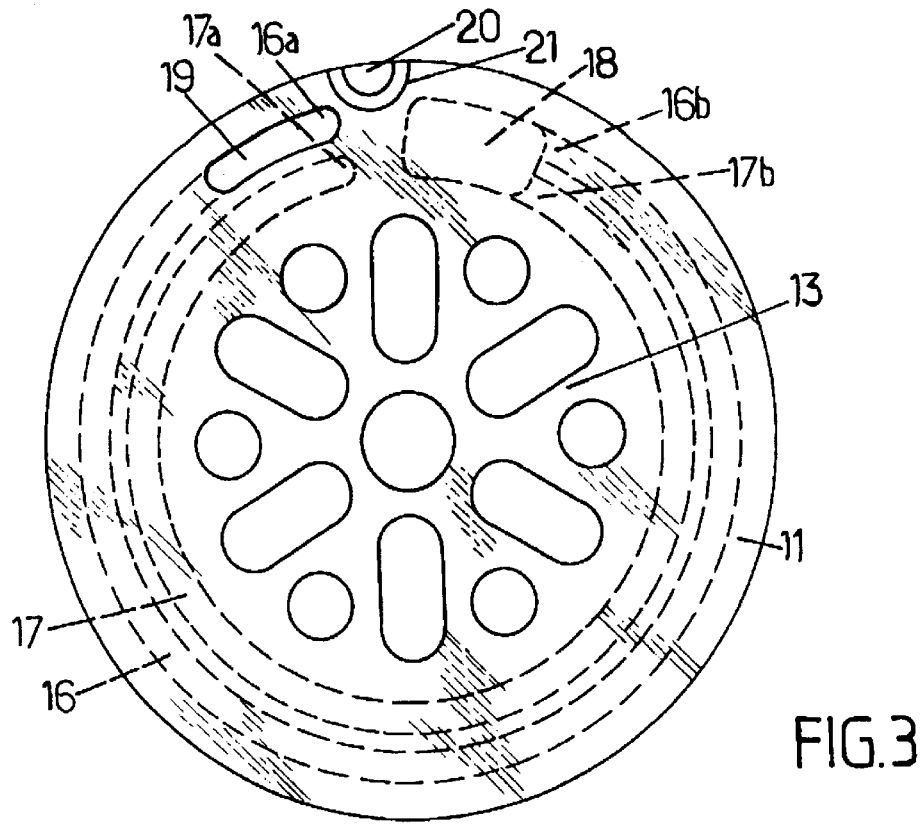
Figure 4:
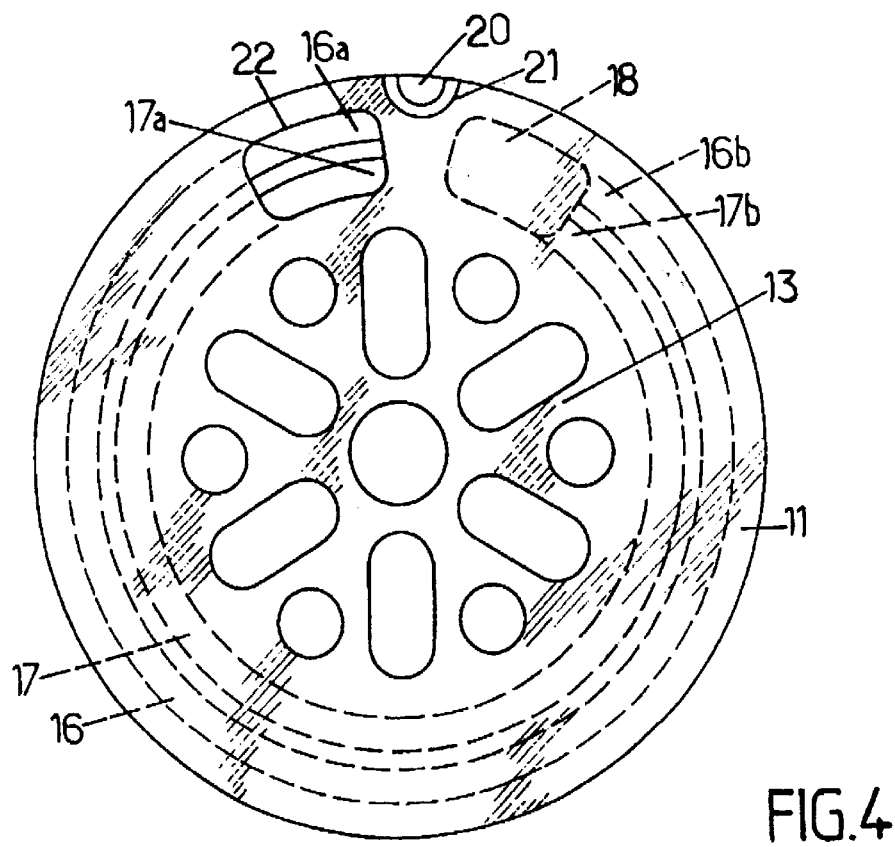

In the drawings:

FIG. 1 is a view in axial section of a hydraulic anti-vibration mount in a first embodiment of the invention, FIG. 2 is a top view of the rigid shell forming the lower part of the partition that separates the working chamber from the compensating chamber of the anti-vibration mount of FIG. 1, FIG. 3 is a top view of the partition of the anti-vibration mount of FIG. 1, and FIG. 4 is a top view of the partition of the anti-vibration mount in a second embodiment of the invention.

The hydraulic anti-vibration mount 1 shown in FIG. 1 comprises, in a manner known per se:

a rigid metal head 2 integral with a metal stud 3 in readiness pointing upward on a vertical axis X, a rigid metal ring 4 centered on the axis X, this ring consisting here of two annular plates 4a, 4b assembled together by riveting, welding or other means, an elastomeric body 5 which connects in a leaktight manner the head 2 to the ring 4, to which two parts it adheres, this elastomeric body being shaped like a bell extending along the X axis between on the one hand an annular base 5a integral with the ring 4 and on the other hand a top 5b integral with the head 2, this elastomeric body consisting of a wall of sufficient thickness to have good resistance to axial compression, so as to play a supporting role when the head 2 is connected for example to part of a motor vehicle engine while the ring 4 is connected to the vehicle bodywork, a thin, flexible boot 7, which is made of elastomer and is sealed to the ring 4, thus defining a closed housing with this ring and the elastomeric body 5, a horizontal rigid metal partition 6 that subdivides the housing into two hydraulic chambers, namely a working chamber A next to the elastomeric body 5 and a compensating chamber B next to the boot 7, a restricted passage C permanently connecting chambers A and B together, this restricted passage being formed in the periphery of the rigid partition 6, the two chambers, and the restricted passage being filled with a liquid, the restricted passage C allowing transfers of liquid between the chambers A and B when the head 2 and the ring 4 undergo relative axial movements of low frequency (for example less than 20 Hz) and of large amplitude (for example more than 0.5 mm), and.these vibratory movements thus being damped by the restricted passage C, a rigid metal cap 8 that covers the boot 7 so as to protect it, this cap 8 comprising a radial annular lip 8a which is clamped axially against the partition 6 by a crimped part 9 of the ring 4, so that the periphery of the boot 7 is clamped and sealed between the lip 8a of the cap and the periphery of the rigid partition 6.

The rigid partition 6 comprises a rigid recessed shell 10, which can for example take the form of a light alloy or plastic molding. This rigid shell 10 has on the one hand a first face, which is oriented toward the working chamber A and is covered by a flat closing plate 11 made of e.g. sheet steel, and on the other hand a second face, which is oriented toward the compensating chamber B.

Recessed into the first face of the rigid shell 10 is a central housing 14 containing a "decoupling" valve 15, consisting for example of a floating elastomeric disk mounted with a small amount of play (for example of the order of 0.5 mm) between two gratings 12, 13, one grating formed in the second face of the rigid shell 10 and the other in the closing plate 11, these two gratings communicating with the compensating chamber B and the working chamber A respectively. The valve 15, in a manner known per se, absorbs axial vibrations of relatively high frequency (for example more than 20 Hz) and of small amplitude (for example less than 0.5 mm) between the head 2 and the ring 4.

Also, as can be seen in FIG. 2, two parallel grooves 16, 17 are let into the first face of the rigid shell 10. Each of these grooves runs between a first end 16a next to a solid part 10a of the rigid shell, to a second end 16b, 17b which runs into a cavity 18 let into the second face of the rigid shell 10 and communicating with the compensating chamber B. The two grooves 16, 17 are independent and separated from each other by a partition 23 that comes into essentially leaktight contact with the closing plate 11 all the way along its length and extends from the first ends 16a, 17a of the two grooves, where the said partition 23 joins the solid part 10a of the rigid shell, to the second ends 16b, 17b of the two grooves where the said grooves communicate with the cavity 18.

In the particular example illustrated in the drawings, the two grooves 16, 17 are concentric and surround the central housing 14 that contains the decoupling valve 15.

In addition, the closing plate 11 comprises, besides the grating 13, a single opening 19 positioned over the first groove 16, in particular over the first end 16a of this groove, so that the restricted passage C consists of the said first groove. In this embodiment the second groove 17 is isolated from the working chamber A and has no function.

It will be seen that the angular locating of the closing plate 11 with respect to the rigid shell 10 can be ensured in particular by means of an error-preventing boss 20 formed on the first face of the rigid shell 10 which fits into a corresponding cavity 21 in the closing plate 11.

In the first embodiment of the invention, described above, the restricted passage C thus determines a set frequency for the anti-vibration mount, that is to say a frequency of maximum damping, which is relatively low, e.g. of the order of 8 Hz.

However, the presence of the second groove 17 in the rigid shell 10 means that the same anti-vibration mount can be used by modifying the closing plate 11 only, in order to obtain a different set frequency of the mount, particularly in order to increase this set frequency.

Thus, in the embodiment illustrated in FIG. 4, the cavity 19 in the closing plate 11 is replaced by a cavity 22 which is wider in the radial direction and provides communication between both of the two grooves 16, 17 and the working chamber A at the first ends 16*a*, 17*a* of these grooves. Consequently the restricted passage C is then formed by both of these grooves 16, 17, meaning that the equivalent diameter of this restricted passage is increased, thus increasing the set frequency of the mount. As a nonlimiting example, the set frequency may thus be of the order of 12 Hz in the example illustrated.

It will be observed that, if necessary, if the grooves 16, 17 were of different cross sections, three different set frequencies could be obtained depending on whether only groove 16, or only groove 17, or both grooves 16 and 17 were in communication with the working chamber A.

What is claimed is:

1. Process for manufacturing hydraulic anti-vibration mounts belonging to at least a first group and a second group of mounts exhibiting a first and a second set frequency, respectively, and being designed to be inserted between two rigid elements that are to be connected together, this process comprising the operations of supplying and assembling:

a first rigid part and a second rigid part, each attachable to one of the two rigid elements to be connected together, an elastomeric body for connecting together the two rigid parts and partially defining a liquid-filled working chamber, a compensating chamber defined partially by a flexible, easily deformable wall, a rigid partition for separating the working chamber from the compensating chamber while defining a restricted passage allowing communication between the said chambers, the rigid partition comprising a rigid recessed shell having first and second faces, the first face of the rigid shell being oriented toward one of the two chambers, termed the first chamber, while the second face of the rigid partition is oriented toward the other of the two chambers, termed the second chamber, this process being characterized in that it comprises the following steps:

a) manufacturing a plurality of rigid shells, all identical with each other, with a first groove and a second groove independent of the first groove, the said grooves being recessed in the first face of the rigid partition and communicating with the first chamber and with the second chamber through at least one opening formed in the rigid shell, b) manufacturing a plurality of closing plates designed to fit substantially leaktightly against the first face of the rigid shells in such a way as to cover the first and second grooves, in order at least partially to define the restricted passage, the closing plates being divided into at least a first group and a second group, the closing plates of the first group having a cavity located over the first groove of the rigid shells and having only a solid part over the second groove of the rigid shells, thus isolating this second groove, and the closing plates of the second group each having a cavity that is located over at least the second groove of the rigid shells, c) producing a first group of anti-vibration mounts by attaching the rigid shells to the closing plates of the first group, and a second group of anti-vibration mounts by attaching the rigid shells to the closing plates of the second group.

2. Process according to claim 1, in which the closing plates of the second group each comprise a cavity that is located over the first and second grooves of the rigid shells.

3. Process according to claim 1, in which:

gratings are formed, one in the rigid shell and the other in the closing plate, there is formed in the rigid shell a central housing that communicates with the first and second chambers, via the gratings, first and second grooves are formed so as to be concentric about the central housing, and a flexible decoupling valve is placed in the central housing.

* * * * *